United States Patent [19]
McGuire

[11] 3,956,964
[45] May 18, 1976

[54] ARMING SYSTEM SAFETY DEVICE

[75] Inventor: Charles H. McGuire, Scottsdale, Ariz.

[73] Assignee: Motorola, Inc., Chicago, Ill.

[22] Filed: Oct. 10, 1974

[21] Appl. No.: 513,906

Related U.S. Application Data

[62] Division of Ser. No. 349,521, April 9, 1973, Pat. No. 3,872,770.

[52] U.S. Cl. ............................................. 89/1.5 D
[51] Int. Cl.² ......................................... B64D 1/04
[58] Field of Search ............ 89/1.5 D, 1.5 R, 1.812; 102/2, 76, 77, 81.2, 81.6

[56]   References Cited
       UNITED STATES PATENTS

| | | | |
|---|---|---|---|
| 1,643,468 | 9/1927 | Paulus | 89/1.5 D |
| 3,326,083 | 6/1967 | Johnson | 89/1.5 D |
| 3,492,911 | 2/1970 | Adams | 89/1.5 D |
| 3,575,084 | 4/1971 | Glendenning et al. | 89/1.5 D |
| 3,625,106 | 12/1971 | Russo et al. | 89/1.5 D |

Primary Examiner—David H. Brown
Attorney, Agent, or Firm—M. David Shapiro; Harry M. Weiss

[57] ABSTRACT

An arming system safety device for a multiple mounting bracket airborne weapon for preventing the arming of the weapon until complete disengagement of all mounting brackets has been achieved includes an arming lanyard retaining member slidably engaging the mounting brackets, the retaining member being held in a first position by the mounting brackets and the ejector hooks of an aircraft for retaining the arming lanyard in a safe position and moving to a release position when all brackets have been completely released.

4 Claims, 7 Drawing Figures

ARMING SYSTEM SAFETY DEVICE

This is a division of application Ser. No. 349,521, filed Apr. 9, 1973, now U.S. Pat. No. 3,872,770.

BACKGROUND

1. Field of Invention

This invention relates generally to arming devices for weapons and more particularly to a safety device for preventing premature arming of the weapon before the weapon has been completely released from the aircraft.

2. Prior Art

Airborne free fall weapons such as bombs have fuzes that must be maintained in a safe condition until the weapon is launched from the aircraft. The arming function in most weapons is provided by an arming lanyard, one end of which is connected to the fuze and the other end of which is connected to the aircraft. When the weapon is released from the aircraft, the lanyard is pulled free from the fuze to permit the fuze to start the arming sequence.

Whereas this technique provides a way to achieve arming of the weapon, the prior art system does not insure that the weapon is initiated only after it has been completely released by the aircraft. For example, if one of the aircraft ejector hooks malfunctions or is damaged, and does not release the weapon, the weapon can swing down sufficiently when released by the other ejector hooks to allow the arming sequence of the weapon to start even though the weapon is still attached to the aircraft.

SUMMARY

It is an object of the present invention to provide a safety device for a lanyard arming system for an airborne free fall weapon that prevents the arming sequence of the weapon to begin unless the weapon is completely released by the aircraft.

It is a further object of this invention to provide an arming system safety device that permits safe handling of the weapon on the ground and during aircraft loading operations.

In accordance with a preferred embodiment of the invention, a retaining member is placed between the mounting brackets and held in a first position by the mounting brackets and the ejector hooks of the aircraft for retaining the arming lanyard and preventing withdrawal thereof. After all of the mounting brackets have been released, the retaining member is free to move to a second position for releasing the arming lanyard to allow the arming lanyard to withdrawn. If any one of the mounting brackets has not been released, the retaining member is held in the retaining position to prevent withdrawal of the arming lanyard. A safing pin is provided to retain the retaining member in the first or safety position during ground handling prior to installation on the aircraft.

DETAILED DESCRIPTION

Figure 1:
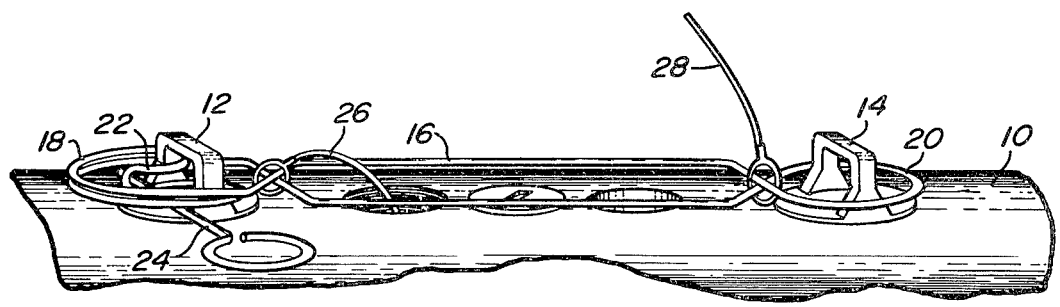
FIG. 1 is a perspective drawing of one embodiment of the arming system safety device according to the invention shown with the safing pin in place to allow handling of the weapon during ground operations.

Referring to FIG. 1, there is shown a portion of a weapon 10 having a pair of mounting brackets 12 and 14 for engagement by the ejector hooks of an aircraft. According to a first embodiment of the invention, an elongated retaining member 16, formed from stiff wire, is placed over the mounting brackets 12 and 14. The ends 18 and 20 of the retaining member 16 define retaining for receiving the brackets 12 and 14, respectively. A finger member 22 extends along the longitudinal axis of the retaining member 16 partially into the opening defined by the end 18. When the retaining member 16 is in place on the weapon 10, the finger member 22 extends through an opening defined by the bracket 12. The finger member 22 has an opening in the end thereof for receiving a safing pin 24 which prevents withdrawal of the finger member 22 from the opening in the bracket 2. An arming lanyard 26 has one end attached to the retaning member 16 at a point near the end 18 and another end connected to a fuze (not shown) within the weapon 10. Another lanyard 28 is attached to the member 16 near the end 20 and to the aircraft which carries the weapon. In this embodiment, the retaining member 16 is formed from a stiff wire, however, it should be noted that the member 16 may be formed of any suitable material, including stamped sheet metal, and still fall within the scope of the invention.

The opening defined by the end 18 is dimensioned to allow the retaining member 16 to move along its longitudinal axis to allow the finger member 22 to be removed from the opening in the bracket 12 only if the safing pin 24 has been removed. The opening defined by the end 20 is dimensioned to receive the mounting bracket 14, however, the size of the opening is selected to restrict movement of the retaining member 16 to prevent the finger member 22 from being withdrawn from the opening in the bracket 12 when the bracket 14 is received by the opening in end 20.

Figure 2:
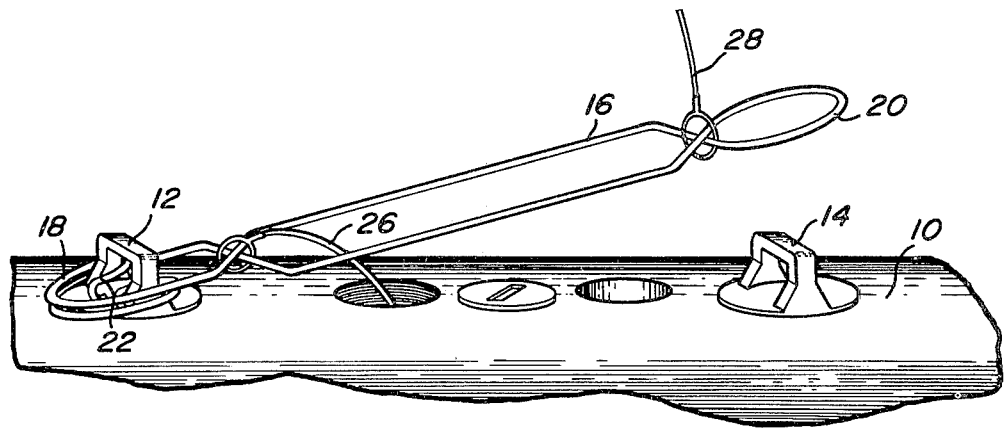
FIG. 2 is a perspective view of the safety device according to the invention shown with the safing pin withdrawn and the safety device partially disengaged from the mounting brackets after the mounting brackets have been released.
Figure 3:
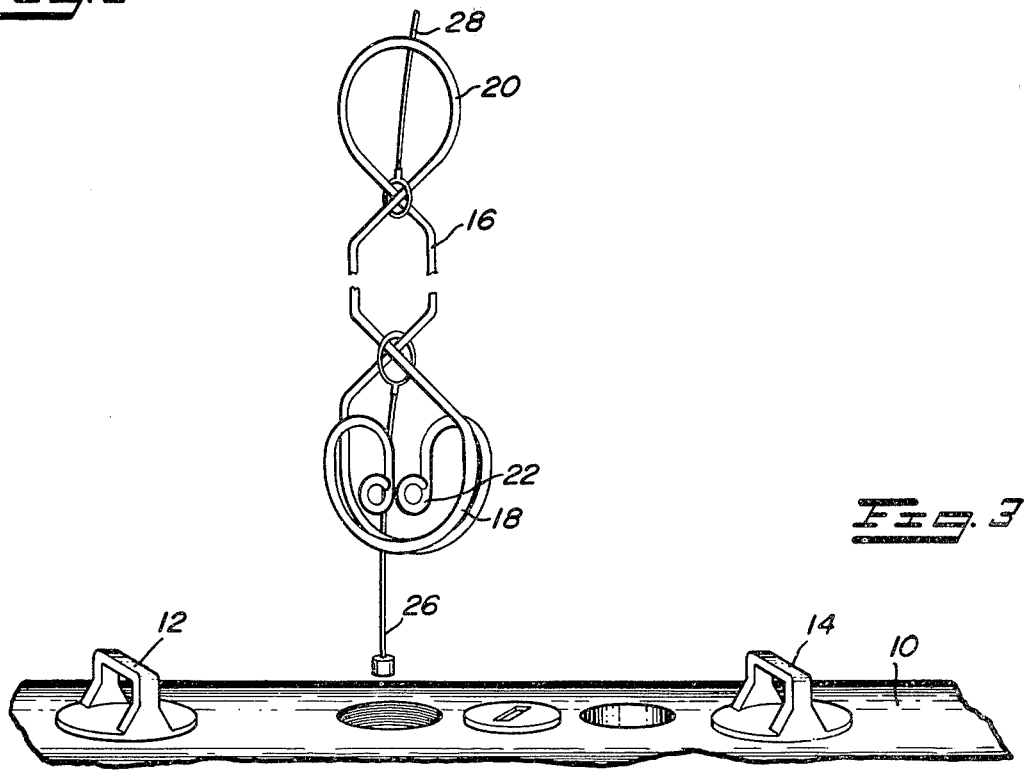
FIG. 3 is a perspective view of the device of FIGS. 1 and 2 shown after complete withdrawal of the arming lanyard.

When the weapon 10 is loaded onto an aircraft, the brackets 12 and 14 are engaged by the ejector hooks on a bomb rack of the aircraft. After the weapon 10 has been attached to the aircraft, the safing pin 24 is removed and the member 16 is retained in place by the brackets 12 and 14 and by the aircraft ejector hooks (not shown). When the weapon 10 has been released by the aircraft, as shown in FIG. 2, the end 20 is disengaged from the bracket 14 by the lanyard 28. The end 18, however, is temporarily held in engagement with the bracket 12 by the finger member 22. As the weapon continues to fall, the member 16 is pulled back to the lanyard 28 to bring the finger member 22 out of the opening in the bracket 12, thereby disengaging the member 16 from the bracket 12. After the member 16 has been completely disengaged from the weapon, the lanyard 26 can be withdrawn from the weapon 10 by means of the lanyard 28 and the member 16. FIG. 3 shows the member 16 completely disengaged from the weapon 10 and the lanyard 26 completely withdrawn.

Should either of the ejector hooks fail to release, the member 16 will remain in engagement with at least one of the brackets 12 and 14, thereby preventing the withdrawal of the lanyard 26. For example, if the ejector hook engaging the bracket 12 fails to release after the ejector hook engaging the bracket 14 has released, the member 16 will be held in place by the ejector hook engaging the bracket 12 and the member 16 will assume a position similar to the position shown in FIG. 2. In this event, the end 20 will swing clear of the bracket 14, however, since the end 18 will be held in place by the malfunctioning ejector hook, and since the lanyard 26 is connected to a point near the end 18, the movement of the end 20 will result in insufficient movement at the point of attachment of the lanyard 26 to the member 16 to allow withdrawal of the lanyard 26. Should the ejector hook engaging the bracket 14 malfunction after proper operation of the hook engaging the bracket 12, the end 20 will be held in position by the ejector hook engaging the bracket 14 and the member 16 will remain in a position similar to the position shown in FIG. 1. Because the opening in the end 20 is dimensioned to prevent the withdrawal of the finger member 22 from the bracket 12 when the bracket 14 is received by the opening in the end 20, retaining the end 20 over the bracket 14 maintains the end 18 captive over the bracket 12, thereby preventing withdrawal of the lanyard 26 until both brackets 12 and 14 are released by their respective ejector hooks.

Figure 4:
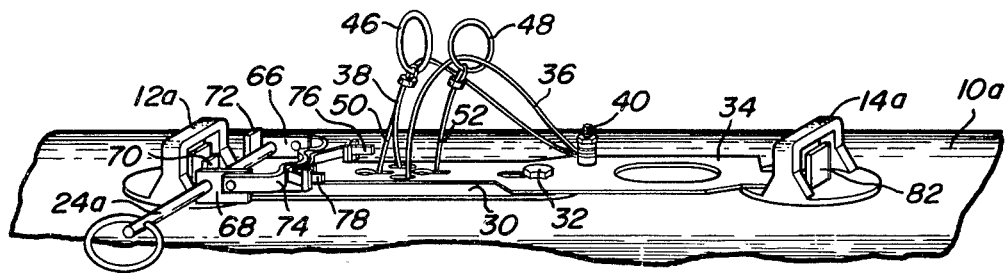
FIG. 4 is a perspective view of another embodiment of the safety device according to the invention shown with the safing pin in place for ground handling.
Figure 4A:
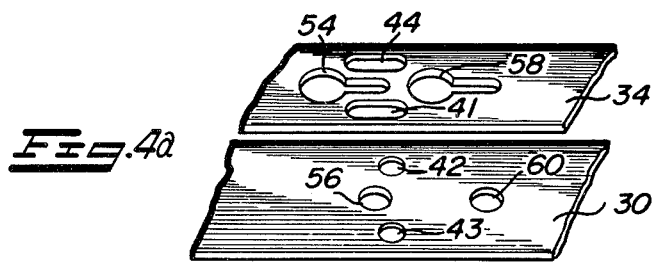
FIG. 4a is an exploded perspective view of a portion of the slidable plates shown in FIG. 4, and shows the keyhole shaped locking holes.

Referring to FIGS. 4 and 4a, there is shown another embodiment of the arming system safety device according to the invention. Components of FIGS. 4, 5 and 6 that are similar to respective components in FIGS. 1, 2 and 3 are indicated by similar numeric designations having a suffix added thereto. In FIG. 4, the weapon 10a is mounted to an aircraft by means of the mounting brackets 12a and 14a. The arming system safety device comprises a stationary mounting plate 30 connected to the weapon 10a by means of a mounting screw 32. A sliding plate 34 is slidably mounted to the weapon 10a, also by means of the mounting screw 32. A pair of arming lanyards 36 and 38 are connected to the slidable plate 34 by means of the screw 40 and passed through openings 41–44 in the plates 30 and 34 and are connected to a pair of fuzes (not shown) within the weapon 10a. A pair of draw rings 46 and 48 are connected to a pair of lines, in this embodiment, retaining wires 50 and 52, respectively. Although two lines are shown in this embodiment, any number may be used and still fall within the scope of the invention. The retaining wires 50 and 52 pass through openings 54, 56 and 58, 60, respectively, in the plates 30 and 34. The openings 54 and 58 in the plate 34 are keyhole shaped, as shown in FIG. 4a, and each has a large opening at one end and a relatively narrow opening at the other. The retaining wires 50 and 52 each have an enlargement at one end, in this embodiment heads 62 and 64 are shown in FIG. 6. The openings 54, 58 and the beads 62, 64 are dimensioned such that the beads can pass through the larger ends of the openings 54, 58, but not through the small ends thereof. The openings 56 and 60 are sufficiently large to allow passage of the beads 62 and 64.

In this embodiment, the retaining wires 50, 52 and the arming lanyards 36, 38 are separate wires, but it should be noted that the retaining wires 50, 52 can serve a dual purpose and operate as retaining wires and arming lanyards simultaneously and still fall within the scope of the invention.

The mounting plate 30 has a pair of tabs 66 and 68 having openings therein for receiving the safing pin 24a. The safing pin cannot be withdrawn until the ejector hooks engage the protrusions 80 and 82. This engagement moves plate 34 forward allowing the safing pin to be withdrawn. The slidable plate 34 has a pair of retaining hooks 70 and 72 which engage the safing pin 24a to maintain the slidable plate in a first safety position wherein the narrow portions of the keyhole openings 54, 58 are coincident with the openings 56, 60 to prevent withdrawal of the retaining wires 50, 52. A resilient biasing means, in this embodiment a spring 74 is connected to the tabs 66, 68 and engages a pair of tabs 76, 78 of the slidable plate 34. The spring 74 exerts a biasing pressure on the tabs 76, 78 to cause the slidable plate 34 to move to a second position. In the second position, the large ends of the openings 54, 58 are in line with the openings 56, 60, respectively, to allow the beads 62, 64 to pass therethrough, thereby allowing the lanyards 36, 38 to be withdrawn.

Figure 5:
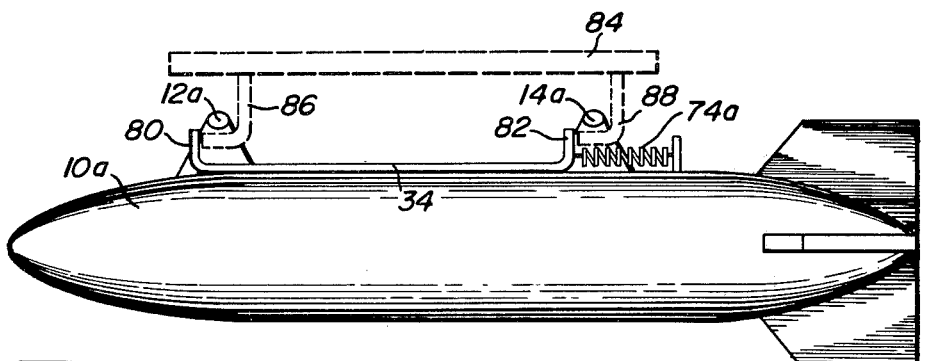
FIG. 5 is a side view of a weapon employing the safety device of FIG. 4, simplified for clarity, mounted to an aircraft showing the retention of the safety device of the invention in the first retaining position by the aircraft ejector hooks.
Figure 6:
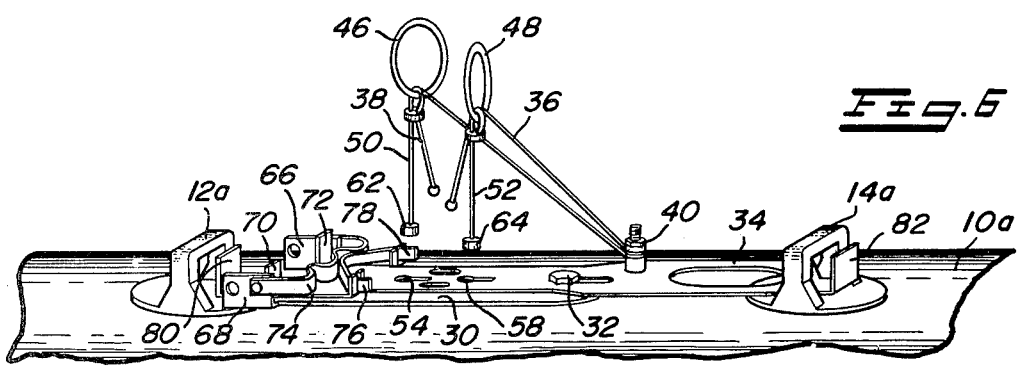
FIG. 6 shows the position of the safety device of the instant invention after the weapon has been completely released and the lanyard initiated.

The slidable plate 34 has a pair of protrusions 80 and 82, as shown in FIG. 5, each of which extends upward from the plate 34 and partially into the opening in one of the brackets 12a and 14a, respectively. FIG. 5 shows the weapon 10a mounted to a bomb rack 84 of an aircraft by means of ejector hooks 86 and 88. The embodiment shown in FIG. 5 has been simplified to more clearly show the engagement of the safety device by the ejector hooks 86 and 88. The ejector hooks 86, 88 pass through the mounting brackets 12a, 14a, respectively, thereby holding the weapon 10a in place. The ejector hooks 86, 88 also engage the protrusions 80, 82 and maintain the plate 34 in the first or safety position, and allow withdrawal of the safing pin 24a. When the weapon 10a is dropped, the ejector hooks 86, 88 retract to release the weapon and are disengaged from the brackets 12a, 14a and the protrusions 80, 82, respectively. After the weapon has been completely released, the slidable plate 34 is urged toward the second position by the spring 74 of FIG. 4, which exerts pressure on the tabs 76 and 78. Spring 74 is shown schematically as spring 74a in FIG. 5, and any stored energy device (pneumatic, hydraulic, etc.) may be employed to urge the plate 34 to its second position.

When the plate 34 is in its second position, the retaining wires 50, 52 may be withdrawn by means of the rings 46, 48, which are attached to the aircraft. Should either of the ejector hooks 86, 88 fail to retract properly, the sliding plate 34 will be maintained in the first or safety position by eht unretracted hook which remains in engagement with one of the protrusions 80 and 82. The aforementioned action prevents the weapon 10a from being armed in the event of failure of one of the ejector hooks. Should an ejector hook fail, the weapon 10a can be easily removed from the aircraft, upon landing, by replacing the safing pin 24a into the tabs 66, 68, and by manually removing the weapon from the aircraft rack.

FIG. 6 shows the position of the slidable plate 34 after the weapon 10*a* has been dropped. In the aforementioned figure the slidable plate 34 has been urged towards its second position by the spring 74 to allow the large ends of the keyhole openings 54, 58 to line up with the openings 56, 60. The retaining wires 50, 52 are shown in their withdrawn position, and the lanyards 36, 38 are shown being withdrawn from the fuzes within the weapon 10*a* by the draw rings 46, 48. Upon complete withdrawal of the lanyards 36, 38 from the weapon, the lanyards will pass through the draw rings as the weapon drops away from the aircraft. In the event that separate lanyards 36, 38 passing through the draw rings 46, 48 are not used, the lanyards can be attached to the retaining wires 50, 52 at a point near the beads 62, 64 to be withdrawn by the retaining wires upon release of the weapon.

In summary, the structure of the present invention provides a simple and reliable means for preventing the unintentional arming of an airborne weapon. The safety device according to the instant invention is particularly useful in the "one hook" or "one lug" case wherein one of the ejector hooks of the aircraft has not completely disengaged the weapon. The instant invention provides positive safety in the "one hook" case by preventing the arming of the weapon should a "one hook" situation occur, a feature not provided by other lanyard arming systems. Although two specific embodiments of the invention have been shown to illustrate the general principles of the invention, it is to be understood that any embodiment employing these general principles falls within the scope and spirit of the invention.

I claim:

1. An arming system safety device for an airborne weapon, said weapon having a plurality of mounting brackets engageable by a plurality of ejector hooks on an aircraft, said weapon being equipped with a fuze which is activated by pulling an arming lanyard upon release of the weapon from the aircraft; comprising:
    means for retaining said arming lanyard responsive to engagement of any one of said plurality of mounting brackets by any one of said plurality of ejector hooks.

2. The arming system safety device of claim 1 wherein said retaining means comprises:
    means for preventing disengagement of said retaining means from any one of said mounting brackets which is engaged by any one of said plurality of ejection hooks;
    means for connecting a subsystem of said lanyard between said preventing means and said fuze; and
    means for connecting another subsystem of said lanyard between said preventing means and said aircraft.

3. The arming system safety device of claim 1 wherein said retaining means comprises:
    means for locking said retaining means to said weapon prior to flight of said aircraft, said locking means preventing said lanyard pull in the absence of any engagement of said plurality of ejector hooks with said mounting brackets.

4. The arming system safety device of claim 1 wherein said retaining means is formed from stiff wire.

* * * * *